(12) United States Patent
Liao et al.

(10) Patent No.: US 8,746,720 B2
(45) Date of Patent: Jun. 10, 2014

(54) LEISURE FITNESS BIKE

(75) Inventors: Xue-Sen Liao, Hsin Chu Hsien (TW);
Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 3 days.

(21) Appl. No.: 13/586,015

(22) Filed: Aug. 15, 2012

(65) Prior Publication Data
US 2013/0082452 A1 Apr. 4, 2013

(30) Foreign Application Priority Data

Sep. 29, 2011 (TW) .............................. 100218257 U

(51) Int. Cl.
*B62M 1/16* (2006.01)

(52) U.S. Cl.
USPC ............ 280/244; 280/248; 280/253; 280/257

(58) Field of Classification Search
USPC ......... 280/250, 244, 245, 246, 247, 248, 253, 280/254, 255, 256, 257, 258
See application file for complete search history.

(56) References Cited

U.S. PATENT DOCUMENTS

| | | | | | |
|---|---|---|---|---|---|
| 1,368,066 | A | * | 2/1921 | Starr | 280/240 |
| 4,861,055 | A | * | 8/1989 | Jones | 280/234 |
| 4,911,457 | A | * | 3/1990 | Ishikawa | 280/240 |
| 4,925,200 | A | * | 5/1990 | Jones | 280/233 |
| 5,280,936 | A | * | 1/1994 | Schmidlin | 280/234 |
| 5,330,218 | A | * | 7/1994 | Escudero | 280/245 |
| 5,876,052 | A | * | 3/1999 | Olson et al. | 280/244 |
| 6,916,032 | B2 | * | 7/2005 | Wong | 280/244 |
| 7,938,419 | B2 | * | 5/2011 | Leslie | 280/244 |
| 2003/0227154 | A1 | * | 12/2003 | Yo | 280/244 |

FOREIGN PATENT DOCUMENTS

DE 3149184 A1 * 9/1983 ............... B62M 1/00

* cited by examiner

*Primary Examiner* — Kevin Hurley
(74) *Attorney, Agent, or Firm* — Rosenberg, Klein & Lee

(57) ABSTRACT

A leisure fitness bike has a front frame hinged to a rear frame, a handlebar and a front wheel. A pedal body is installed at upper and lower ends of the front frame. The rear frame includes a saddle, a rear wheel and a rear wheel transmission device. A driving device is between the front and rear frames and coupled to a rear wheel transmission device. After a rider sits on the saddle and puts both hands and legs onto the handlebar and the pedal body, the front frame is moved forward and backward by stretching and contracting forces, and the driving device drives the rear wheel transmission device to roll the rear wheel and move the bike body.

11 Claims, 3 Drawing Sheets

LEISURE FITNESS BIKE

BACKGROUND OF THE INVENTION

1. Field of the Invention

The present invention relates to a leisure fitness bike, and more particularly to the improved leisure fitness bike with the features of a simple structure and an easy and convenient use. Unlike riding a conventional fitness bike, riders can enjoy the recreation, fan and diversity of the bike with both transportation and exercise effects.

2. Description of the Related Art

Among various different types of fitness bikes, the bicycles used for outdoors are the representative ones, and the way of installing and operating the bicycle mainly installs a chain wheel and left and right cranes to a bottom bracket, wherein a pedal is installed separately at the left and right cranes and the two pedals are installed with an included angle equal to 180 degrees, so that a rider's legs can pedal both pedals alternately by a circular motion. When the chain wheel rotates, a free wheel drives the rear wheel to rotate and move forward. In other words, the conventional way of pedaling and driving a bicycle is achieved by the circular pedaling of both legs of the rider, which is a pedal driving method. As to the bicycle rider, such pedal driving method provides a very high efficiency and is commonly used. In addition, the bicycle is generally used for short-distance transportation or for exercises, so that the operation requirement is not intended to give fun to the riders. However, a leisure fitness bike with the purposes of recreation and exercise, the way of driving and operation of the bicycle is relatively rigid without much diversity or refreshing, or even is too boring for the riders to continue their ride.

SUMMARY OF THE INVENTION

In view of the aforementioned drawbacks of the prior art, the inventor of the present invention based on years of experience in the related industry to conduct extensive researches and experiments, and finally invented the present invention to overcome the drawbacks of the prior art.

Therefore, it is a primary objective of the present invention to overcome the aforementioned drawbacks by providing a leisure fitness bike with a riding different from the riding of a general bicycle to provide fun, recreation and diversity to the transportation, leisure and exercise purposes.

To achieve the aforementioned objective, the present invention comprises a front frame of a frame movably hinged to a rear frame, and a handlebar and a front wheel, and a pedal body installed at upper and lower ends of the front frame respectively, and the rear frame includes a saddle, a rear wheel and a rear wheel transmission device, and a driving device is installed between the front and rear frames and coupled to a rear wheel transmission device, so that after a rider sits on the saddle and puts both hands and legs onto the handlebar and the pedal body respectively, the front frame is moved forward and backward by the stretching and contracting forces, and the driving device drives the rear wheel transmission device to roll the rear wheel and move the bike body. With the unique operation, the fitness bike of the present invention provides fun, recreation, and diversity to the exercise, leisure and transportation of the bike.

The objectives, technical characteristics, measures, effects and advantages of the present invention will become apparent with the detailed description of preferred embodiment accompanied with the illustration of related drawings as follows.

DETAILED DESCRIPTION OF THE PREFERRED EMBODIMENTS

Figure 1:
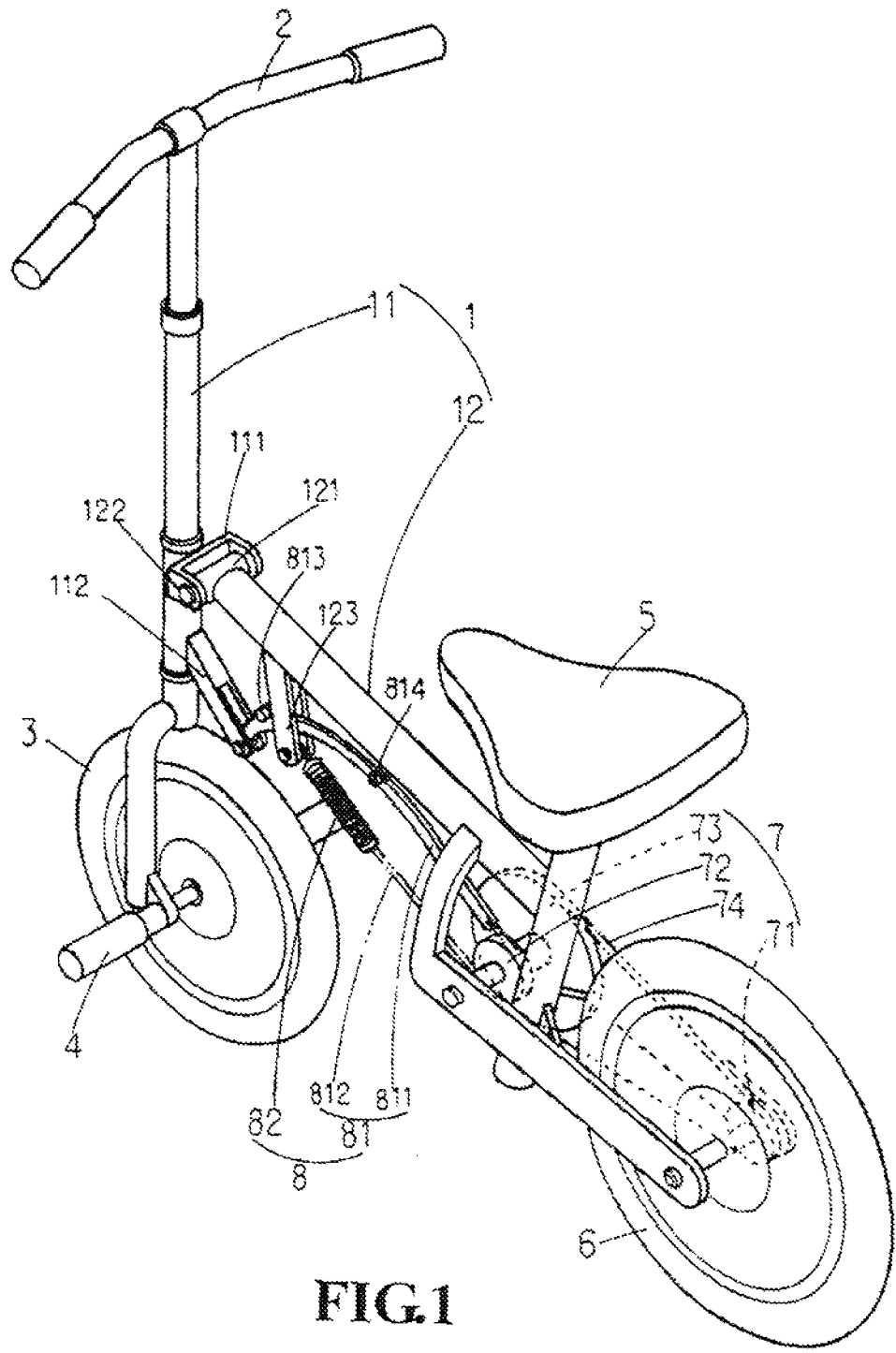
FIG. 1 is a perspective view of a preferred embodiment of the present invention.
Figure 2:
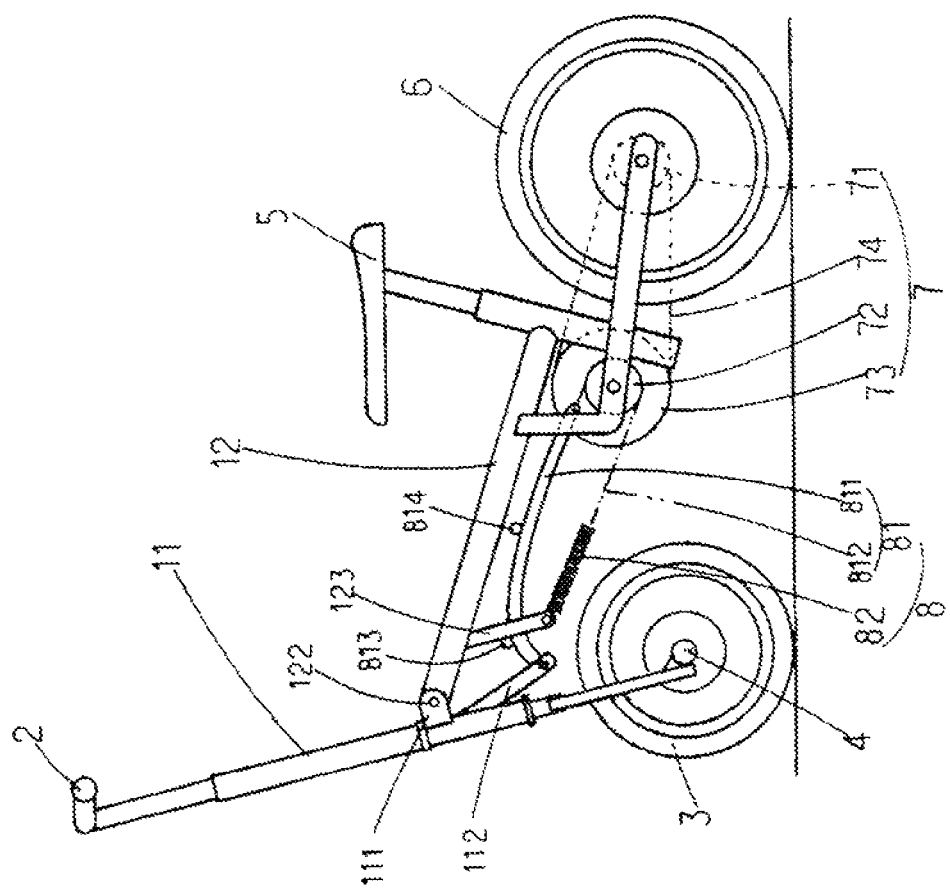
FIG. 2 is a schematic planar view of a lower end of a front frame, a front wheel, and a pedal body being moved to the rear in accordance with a preferred embodiment of the present invention.
Figure 3:
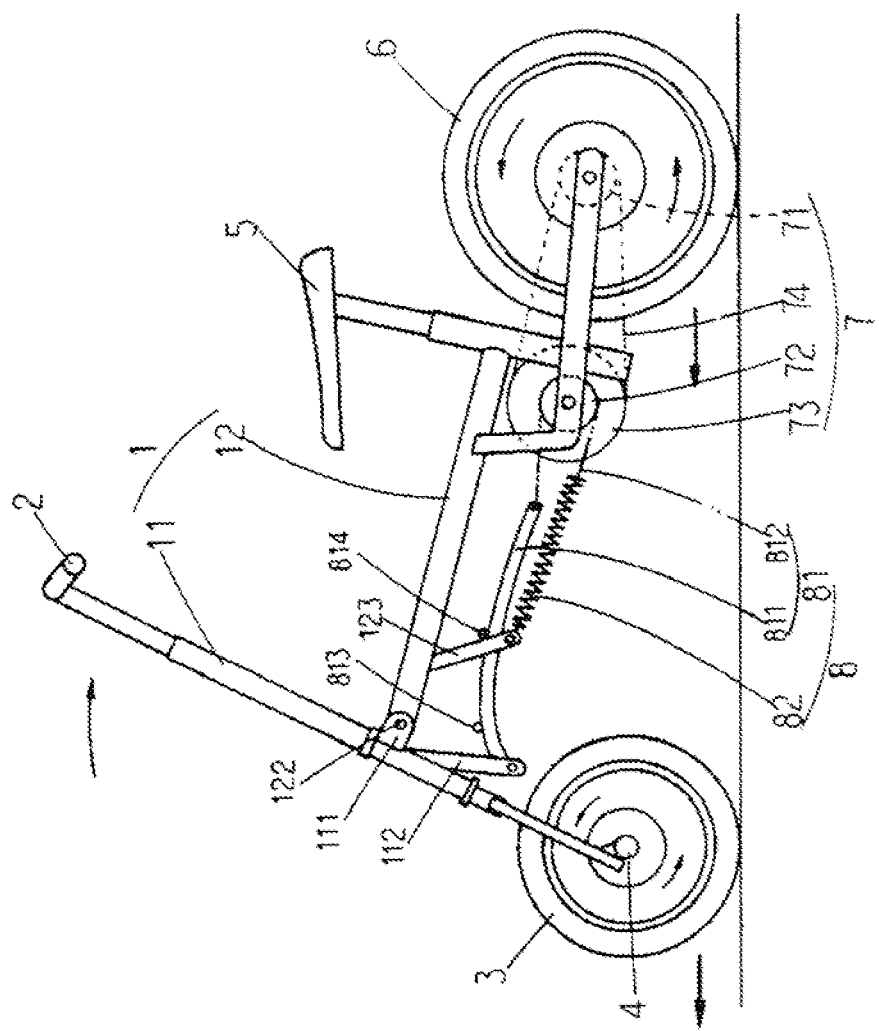
FIG. 3 is a schematic planar view of a lower end of a front frame, a front wheel, and a pedal body being moved to the front in accordance with a preferred embodiment of the present invention.

With reference to FIGS. 3 and 2 for an improved leisure fitness bike of the present invention, the leisure fitness bike comprises a frame 1 including a front frame 11 swung to the front and the rear and pivotally coupled to a rear frame 12, and a handlebar 2 and a front wheel 3, and a pedal body 4 installed at upper and lower ends of the front frame 1 respectively, and the rear frame 12 comprises a saddle 5, a rear wheel 6 and a rear wheel transmission device 7, and a driving device 8 is installed between the front and rear frames 11, 12 and coupled to the rear wheel transmission device 7.

The front frame 11 includes a hinge ear 111 coupled to a front hinge portion 121 of the rear frame 12 and movably hinged by a pivot 122, such that upper and lower ends of the front frame 11 can be moved to the front and the rear by using the pivot 122 as a hinge.

The rear wheel transmission device 7 includes a free wheel 71 coaxially installed with the rear wheel 6, or a transmission set comprising transmission elements such as at least one free wheel 71, a first transmission wheel 72, a second transmission wheel 73 and a first transmission belt 74.

The driving device 8 includes a driving element 81 and a position restoring element 82, wherein an end of the driving element 81 is coupled to the front frame 11 and the other end surrounded around the free wheel 71 or the first driving wheel 72 of the rear wheel transmission device 7 and then coupled to an end of the position restoring element 82 and the other end of the position restoring element 82 is coupled to the frame 1 or the rear frame 12, and the lower end of the front frame 11 together with the front wheel 3, and the pedal body 4 always have a back-swinging resilience force.

Wherein, the driving element 81 of the driving device 8 comprises a driving rod 811 coupled with a driving belt 812, and an end of the driving rod 811 is movably hinged with the extension arm 112 of the front frame 11, and the other end is coupled to the driving belt 812, and the other end of the driving belt 812 is surrounded around the free wheel 71 or the first driving wheel 72 of the rear wheel transmission device 7 and then coupled to the position restoring element 82.

Wherein, the driving element 81 of the driving device 8 can be the driving belt 812 with an end coupled to the front frame 11 and the other end surrounded around the free wheel 71 or the first driving wheel 72 of the rear wheel transmission device 7 and then coupled to the position restoring element 82.

Wherein, the driving element 81 includes front and rear block members 813, 814 installed at predetermined positions and corresponding to the frame extension arm 123 for limiting the distance of front and rear displacement of the driving element 81 and the amplitude of front and rear swing of the front frame 11.

Wherein, the rear wheel transmission device 7 can use the free wheel 71 coaxially installed with the rear wheel 6 and provided for a driving operation by the driving element 81(812) of the driving device 8, so as to drive the rear wheel 6 to rotate directly and increase the rotation speed of the rear wheel 6, and the rear wheel transmission device 7 further comprises transmission elements such as at least one first driving wheel 72, a second driving wheel 73 and a first driving belt 74 to transmit motive power force to the free wheel 71. Wherein, the first driving wheel 72 has a relatively smaller diameter for driving the driving element 81(812) of the driving device 8, and the second driving wheel 73 and the first driving wheel 72 are installed coaxially with each other and have a relatively greater diameter for coupling the free wheel 71 with a smaller diameter through the first driving belt 74, so that the rear wheel 6 driven by the driving device 8 can achieve the expected effect of the increased speed.

In FIG. 3, the front frame 11 can be moved to the front and the rear through the pivot 122 and coupled to the rear frame 12, and both ends of the driving element 81 of the driving device 8 are coupled to the front frame 11 and the rear wheel transmission device 7 respectively. With the position restoring element 82, the lower end of the front frame 11 together with the front wheel 3 and the pedal body 4 always have the back-swinging resilience force, so that after the rider sits on the saddle 5 of the rear frame 12, and puts both hands and legs on the handlebar 2 and the pedal body 4 at the upper and lower ends of the front frame 11 respectively, the stretching and contracting forces produced from the coordination and movements of the rider's hands and legs push the upper and lower ends of the front frame 11 to swing to the front and the rear alternately. When the driving element 81 is pulled or moved forward, the rear wheel transmission device 7 is driven, such that the rear wheel 6 is driven to and drive and move the car body, and then swing back to pull back the driving element 81 by the position restoring element 82. Now, the rear wheel transmission device 7 can be idled without driving the rear wheel 6, so as to move the front wheel 3 smoothly and back-swing and return to the original position and get ready for the next front swinging cycle. Of course, the lower end of the front frame 11 always has the back-swinging resilience force, so that it saves power and achieve a smooth movement of pushing the handlebar 2 at the upper end of the front frame 11 by the rider's hands of the rider.

Since the front and rear block members 813, 814 installed at the driving element 81 of the driving device 8 can be block the frame extension arm 123 at a predetermined position in the displacement of the driving element 81 in order to control the amplitude of the front and back swings of the front frame 11, and the rider can apply the stretching and contracting forces of both hands and legs to push the front frame 11 to move, so as to achieve the effects of riding the bike and the expected safety and smoothness of riding.

In other words, after the rider sits on the saddle 5 and applies stretching and contracting force to the upper and lower ends of the front frame 11 by both hands and legs to ride the bike. The bike not only features uniqueness, fun, recreation and diversity, but also expand the scope of physical exercises while providing the transportation, leisure and exercise effects.

In other words, the leisure fitness bike of the present invention has the advantages of simple structure, and easy and convenient operation and use.

The leisure fitness bike allows users to expand the scope of physical exercises while providing the transportation, leisure and exercise effects.

In summation of the description above, the present invention achieves the expected objectives and effects and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A leisure fitness bike, comprising:
    a frame including a front section defining a front frame and a rear section defining a rear frame, the front frame pivotally coupled to the rear frame;
    the front section comprising:
        a handlebar coupled to an upper end of the front frame;
        a front wheel coupled to a lower end of the front frame;
        a foot peg defining a pedal body extending through a central axis of the front wheel, the foot peg being secured to the front frame, the front wheel being rotatable with respect to the foot peg;
    the rear section comprising:
        a saddle, a rear wheel and a rear wheel transmission device, the rear wheel rotatably coupled to the transmission device;
        a driving device coupled between the front frame and the rear wheel transmission device, the driving device including a driving element and a position restoring element, an end of the driving element being coupled to the front frame, the other end of the driving element being coupled to the rear wheel transmission device and installed at an end of the position restoring element, and the other end of the position restoring element is disposed at the frame;
    whereby displacing the handlebar in a first direction results in a displacement of the foot peg in a second direction opposite to the first direction and displacing the handlebar in the second direction results in a displacement of the foot peg in the second direction whereby force applied to the handlebar and the foot peg in coordinated movement drives the leisure fitness bike in the first direction.

2. The leisure fitness bike of claim 1, wherein the front frame has a hinge ear, and the rear frame has a pivot portion disposed at a front end of the rear frame, and the hinge ear and the pivot portion are movably hinged by a pivot.

3. The leisure fitness bike of claim 1, wherein the rear wheel transmission device includes a free wheel axially installed with the rear wheel and provided for driving the driving element of the driving device.

4. The leisure fitness bike of claim 1, wherein the rear wheel transmission device includes at least one free wheel coaxially installed with the rear wheel, and a coaxial first transmission belt installed between a first transmission wheel, a second transmission wheel and a free wheel coupled to the second transmission wheel constitute a transmission set.

5. The leisure fitness bike of claim 4, wherein the first transmission wheel of the rear wheel transmission device has a diameter smaller than that of the second transmission wheel and is provided for driving the driving element of the driving device.

6. The leisure fitness bike of claim 1, wherein the driving element of the driving device includes a driving rod and a driving belt, and an end of the driving rod is movably hinged to the front frame, and the other end of the driving rod is coupled to an end of the driving belt, and the other end of the driving belt is coupled to the rear wheel transmission device, and then a position restoring element is installed.

7. The leisure fitness bike of claim 6, wherein the front frame includes an extension arm for hinging the driving rod.

8. The leisure fitness bike of claim 1, wherein the driving element of the driving device is a driving belt with an end coupled to the front frame and the other end coupled to the rear wheel transmission device, and then a position restoring element is installed.

9. The leisure fitness bike of claim 1, wherein the position restoring element of the driving device has an end coupled to the driving element and the other end installed at the rear frame.

10. The leisure fitness bike of claim 1, wherein the driving element of the driving device has front and rear block members installed at predetermined positions and corresponding to the frame.

11. The leisure fitness bike of claim 10, wherein the frame includes an extension arm provided for blocking by the front and rear block members of the driving element.

* * * * *